US011785545B2

(12) United States Patent
Su et al.

(10) Patent No.: US 11,785,545 B2
(45) Date of Patent: Oct. 10, 2023

(54) INACTIVE MODE OPERATIONS

(71) Applicant: Apple Inc., Cupertino, CA (US)

(72) Inventors: Li Su, San Jose, CA (US); Muthukumaran Dhanapal, San Diego, CA (US); Vijay Venkataraman, San Jose, CA (US); Srinivas Burugupalli, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/806,978

(22) Filed: Jun. 15, 2022

(65) Prior Publication Data

US 2022/0312322 A1 Sep. 29, 2022

Related U.S. Application Data

(62) Division of application No. 16/601,713, filed on Oct. 15, 2019, now Pat. No. 11,432,239.

(60) Provisional application No. 62/747,397, filed on Oct. 18, 2018.

(51) Int. Cl.
*H04W 76/27* (2018.01)
*H04W 36/24* (2009.01)
*H04W 52/02* (2009.01)
*H04W 36/02* (2009.01)
*H04W 36/00* (2009.01)
*H04W 76/28* (2018.01)

(52) U.S. Cl.
CPC ... *H04W 52/0229* (2013.01); *H04W 36/0033* (2013.01); *H04W 36/023* (2013.01); *H04W 36/24* (2013.01); *H04W 76/27* (2018.02); *H04W 76/28* (2018.02)

(58) Field of Classification Search
CPC ......... H04W 52/0229; H04W 36/0033; H04W 36/023; H04W 36/24; H04W 76/27; H04W 76/28; H04W 48/20; H04W 36/0055; H04W 48/16; H04W 52/0248; H04W 52/0209
See application file for complete search history.

(56) References Cited

U.S. PATENT DOCUMENTS

| 2011/0111759 A1* | 5/2011 | Chami | H04W 48/20 455/436 |
| 2017/0332436 A1* | 11/2017 | Chen | H04W 76/20 |
| 2018/0176834 A1* | 6/2018 | Wei | H04W 36/0066 |

(Continued)

*Primary Examiner* — Un C Cho
*Assistant Examiner* — Lalita W Pace
(74) *Attorney, Agent, or Firm* — Fay Kaplun & Marcin, LLP (57) ABSTRACT

Methods related to an inactive state of a user equipment (UE). In one example, when an amount of data in an uplink buffer is less than a threshold, the data is sent to the network while remaining in the inactive state. In another example, when reselecting to a different cell, the UE attempts to reselect to the different cell and remain in the inactive state. When transitioning to a connected state at the reselected cell, the UE sends a resume request including an identification of the first cell. In another example, when a high priority or a background PLMN search is performed in the inactive state, the results are cached and implemented the earlier of when a timer expires or the UE enters an idle state. In another example, a cell reselection criteria is altered in the inactive state to make it less likely that a cell reselection will occur.

17 Claims, 6 Drawing Sheets

(56) References Cited

U.S. PATENT DOCUMENTS

| | | | |
|---|---|---|---|
| 2018/0206248 A1* | 7/2018 | Zhang | H04W 76/30 |
| 2018/0220486 A1* | 8/2018 | Tseng | H04W 36/305 |
| 2018/0234890 A1* | 8/2018 | Shih | H04W 60/00 |
| 2019/0313309 A1* | 10/2019 | Tsuboi | H04W 74/0833 |
| 2020/0029239 A1* | 1/2020 | Chen | H04W 76/27 |
| 2020/0120741 A1* | 4/2020 | Lindheimer | H04W 76/19 |
| 2021/0029581 A1* | 1/2021 | Kim | H04W 76/19 |

* cited by examiner

INACTIVE MODE OPERATIONS

PRIORITY INFORMATION/INCORPORATION BY REFERENCE

This application claims priority to U.S. Provisional Application 62/747,397 entitled "Inactive Mode Operations," filed on Oct. 18, 2018, the entirety of which is incorporated herein by reference

BACKGROUND INFORMATION

5G New Radio ("NR") networks provide a mechanism for a user equipment ("UE") to transition into a radio resource control ("RRC") inactive state. The RRC inactive state in 5G NR is an intermediate mode between an RRC idle state and an RRC connected state. The RRC inactive state suspends network communications while preserving radio resource allocations at the network. However, UEs re-entering the RRC connected state after entering the RRC inactive state require signaling with the network to resume suspended signaling radio bearers ("SRB"), data radio bearers ("DRB") and security context. This signaling increases network overhead and causes power consumption in the UE.

UEs generally enter the RRC connected state to send or receive data, reselect to a new cell during a handover, or initiate Public Land Mobile Network ("PLMN") handover activities. Power savings resulting from use of the RRC inactive state may be limited when frequent transitions between the connected state, the idle state, and the inactive state are required.

SUMMARY

The exemplary embodiments include a method that is performed by a user equipment ("UE") in an inactive state. The method includes determining an amount of data in an uplink buffer, comparing the amount to a predetermined threshold and when the amount is less than the predetermined threshold, sending a message comprising the data to a network while remaining in the inactive state. The method also includes initiating a timer and when an acknowledgement ("ACK") is received from the network indicating the data has been received from the network before the expiration of the timer, remaining in the RRC inactive state.

Still further exemplary embodiments include a method that is performed by a user equipment ("UE") in an inactive state and camped on a first cell of a radio access network ("RAN"). The method includes determining that one or more cell reselection criteria have been met, reselecting to a second cell and sending a resume request to the RAN via the second cell, wherein the resume request includes an identification of the first cell and comprises a request to enter a connected state with the second cell. The method further includes initiating a timer and when a resume accept is received from the RAN before the expiration of the timer, transitioning to a connected state on the second cell.

In further exemplary embodiments, a method is performed by a user equipment ("UE") in an inactive state on a public land mobile network ("PLMN"). The method includes performing at least one of a high priority PLMN ("HPPLMN") search or a background PLMN ("BPLMN") search, caching results of the HPPLMN or BPLMN search, initiating a timer and when the UE does not transition to an idle state before the expiration of the timer, applying the results of the HPPLMN or BPLMN search when the timer expires.

DETAILED DESCRIPTION

The exemplary embodiments may be further understood with reference to the following description and the related appended drawings, wherein like elements are provided with the same reference numerals. The exemplary embodiments provide devices, systems, and methods for operating in an RRC inactive state for a user equipment ("UE") in a 5G New Radio ("NR") network. The exemplary embodiments are described with respect to the 5G NR network, but may be used in any network that utilizes an RRC inactive state or its equivalent. For example, the RRC inactive state has also been extended to Long Term Evolution (LTE) networks and thus, the exemplary embodiments may also be used in LTE network implementations.

Figure 1:
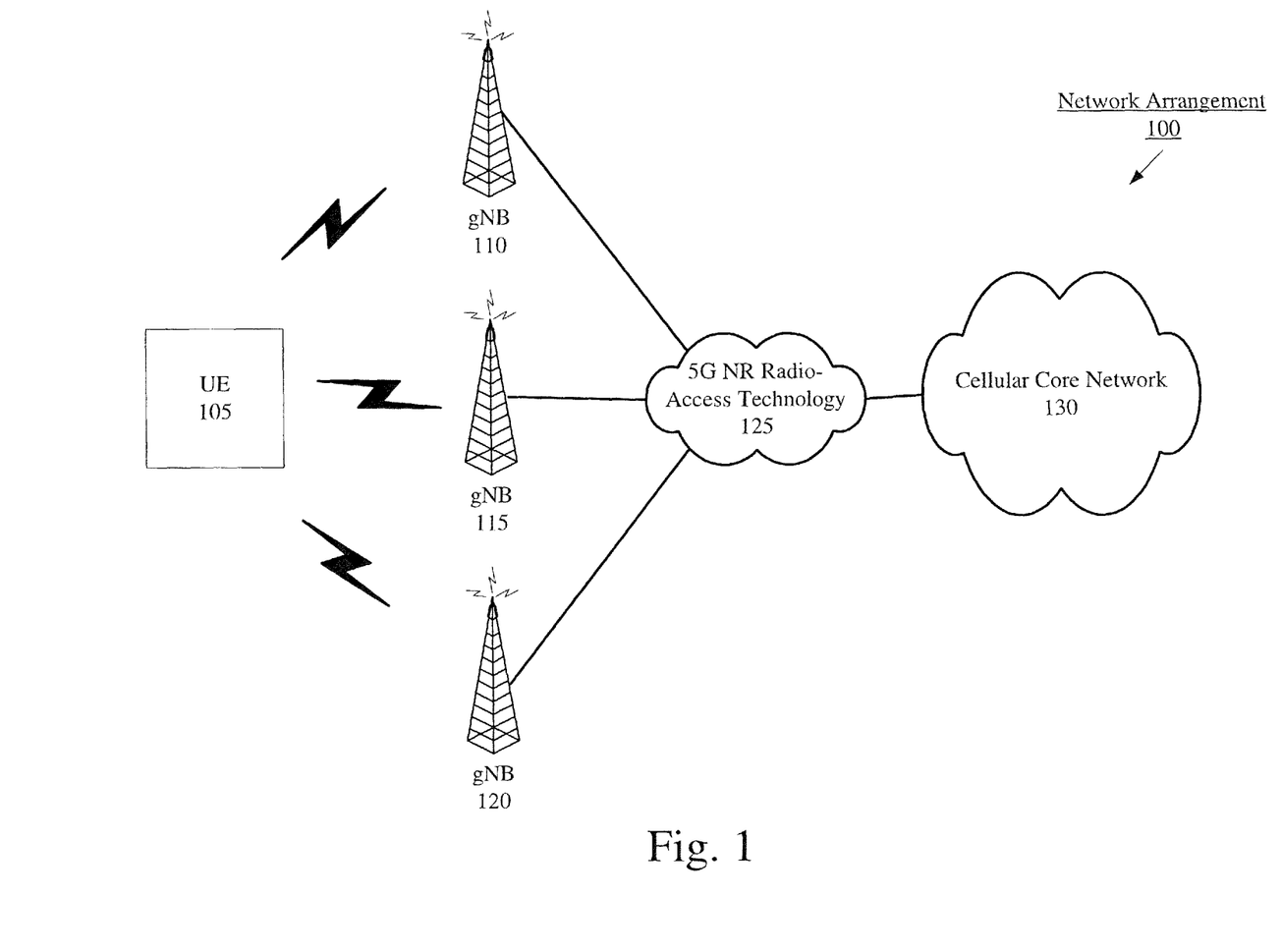
FIG. 1 shows an exemplary network arrangement according to various exemplary embodiments described herein.

FIG. 1 shows an exemplary network arrangement 100 according to various exemplary embodiments described herein. The exemplary network arrangement 100 includes a UE 105. Those skilled in the art will understand that the UE 105 may be any type of electronic component that is configured with 5G NR compatibility, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should be understood that an actual network arrangement may include any number of UEs being used by any number of users and being associated with any number of these users where the user may be associated with one or more UEs. The example of one UE 105 is only provided for illustrative purposes.

The UE 105 may be configured to communicate with one or more networks. In this example, the network with which the UE 105 may communicate is a 5G NR radio-access network ("RAN") 125. However, it should be understood that the UE 105 may also communicate with other types of wireless networks (cellular or non-cellular) and may also communicate using a wired connection. With regard to the exemplary embodiments, the UE 105 may establish a connection with the 5G NR RAN 125 to, among other functionalities, transmit or receive data.

The 5G NR RAN 125 may be a portion of a cellular network deployed by cellular providers or operators (e.g., Verizon, AT&T, Sprint, T-Mobile, etc.). These networks may include, for example, base client stations (e.g. a gNB in a 5G NR RAN) that are configured to send and receive traffic from UEs that are equipped with an appropriate cellular chip set.

The network arrangement 100 also includes a cellular core network 130. The cellular core network 130 and the 5G NR RAN 125 may be considered a cellular network that is associated with a particular cellular provider. The cellular core network 130 may be considered to be the interconnected set of components that manages the operation and traffic of the cellular network. The interconnected components of the cellular core network 130 may include any number of components such as servers, switches, routers, etc.

The exemplary embodiments relate to the UE 105 connecting to the 5G NR RAN 125 via one or more gNBs 110-120. Those skilled in the art will understand that any association procedure may be performed for the UE 105 to connect to the 5G NR RAN 125 via one or more of the gNBs 110-120. For example, as discussed above, the 5G NR RAN 125 may be associated with a particular cellular provider where the UE 105 and/or the user thereof has a contract and credential information (e.g., stored on a SIM card). Upon detecting the presence of the 5G NR RAN 125, the UE 105 may transmit the corresponding credential information to associate with the 5G NR RAN 125. More specifically, the UE 105 may associate with a specific base station (e.g., one of the gNBs 110-120 of the 5G NR RAN 125).

Figure 2:
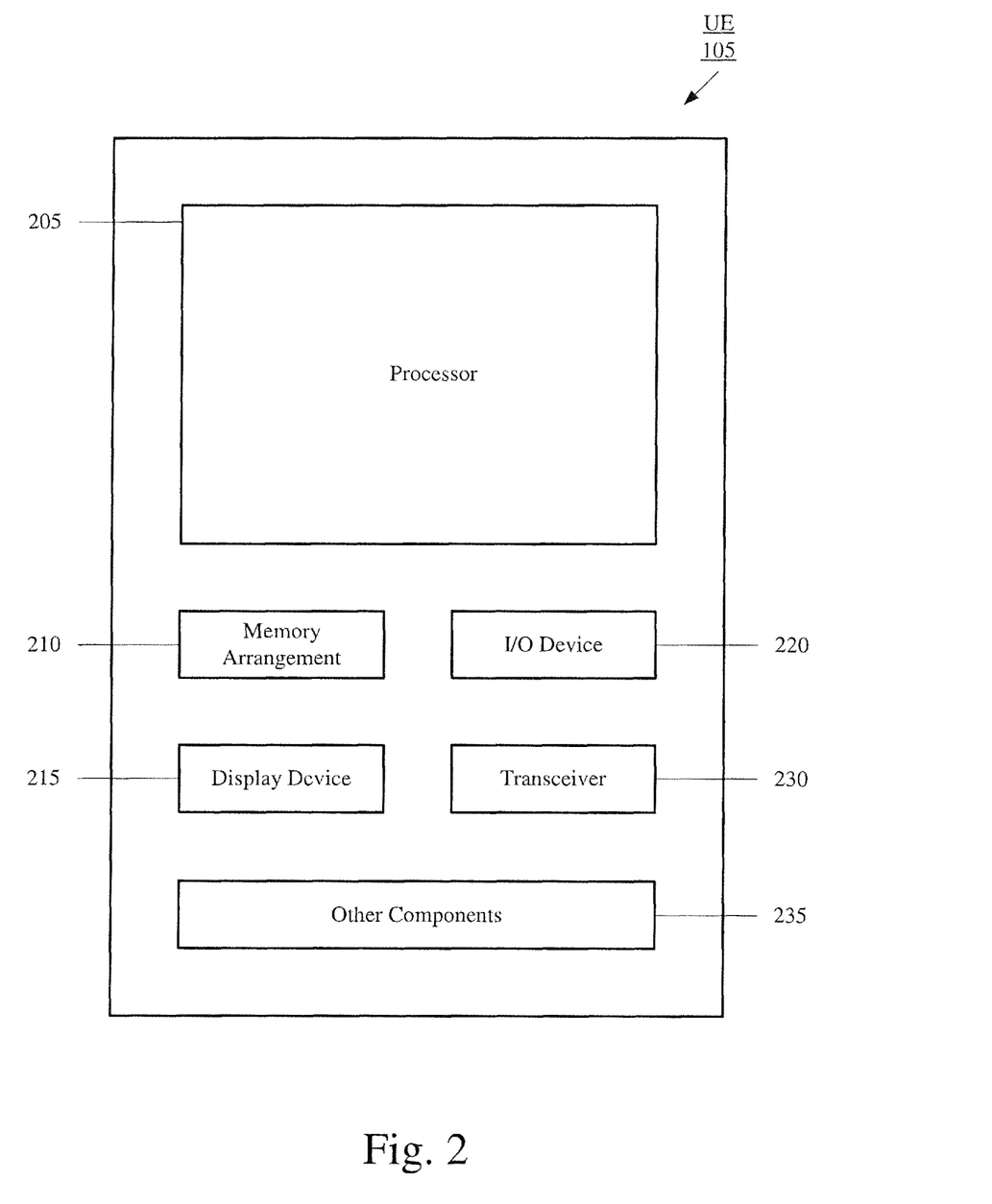
FIG. 2 shows an exemplary user equipment disposed in the network arrangement of FIG. 1 according to various exemplary embodiments described herein.

FIG. 2 shows an exemplary user equipment 105 of the network arrangement 100 of FIG. 1 according to various exemplary embodiments described herein. The UE 105 may represent any electronic device that is configured to perform the wireless functionalities described herein, examples of which are provided above.

The UE 105 may include a processor 205, a memory arrangement 210, a display device 215, an input/output (I/O) device 220, a transceiver 230, and other components 235. The other components 235 may include, for example, an audio input device, an audio output device, a battery, a data acquisition device, ports to electrically connect the UE 105 to other electronic devices, etc. The processor 205 may be configured to execute a plurality of applications of the UE 105.

The described functionalities of the UE 105 being represented as an application (e.g., a program) executed by the processor 205 is only exemplary. The functionality associated with the applications may also be represented as a separate incorporated component of the UE 105 or may be a modular component coupled to the UE 105, e.g., an integrated circuit with or without firmware. In addition, in some UEs, the functionality described for the processor 205 is split among two processors, a baseband processor and an application processor. The exemplary embodiments may be implemented in any of these or other configurations of a UE.

The memory 210 may be a hardware component configured to store data related to operations performed by the UE 105. For example, the memory 210 may store data that the UE 105 is to transmit to the 5G NR RAN 125. In such a situation, the portion of memory 210 that stores this data may be referred to as an uplink ("UL") buffer. The display device 215 may be a hardware component configured to show data to a user while the I/O device 220 may be a hardware component that enables the user to enter inputs. The display device 215 and the I/O device 220 may be separate components or integrated together such as a touchscreen.

The transceiver 230 may be a hardware component configured to transmit and/or receive data. For example, the transceiver 230 may enable communication with other electronic devices directly or indirectly through one or more networks based upon an operating frequency of the network. The transceiver 230 may operate on a variety of different frequencies or channels (e.g., set of consecutive frequencies). Thus, one or more antennas (not shown) coupled with the transceiver 230 may enable the transceiver 230 to operate on the 5G NR frequency band.

Figure 3:
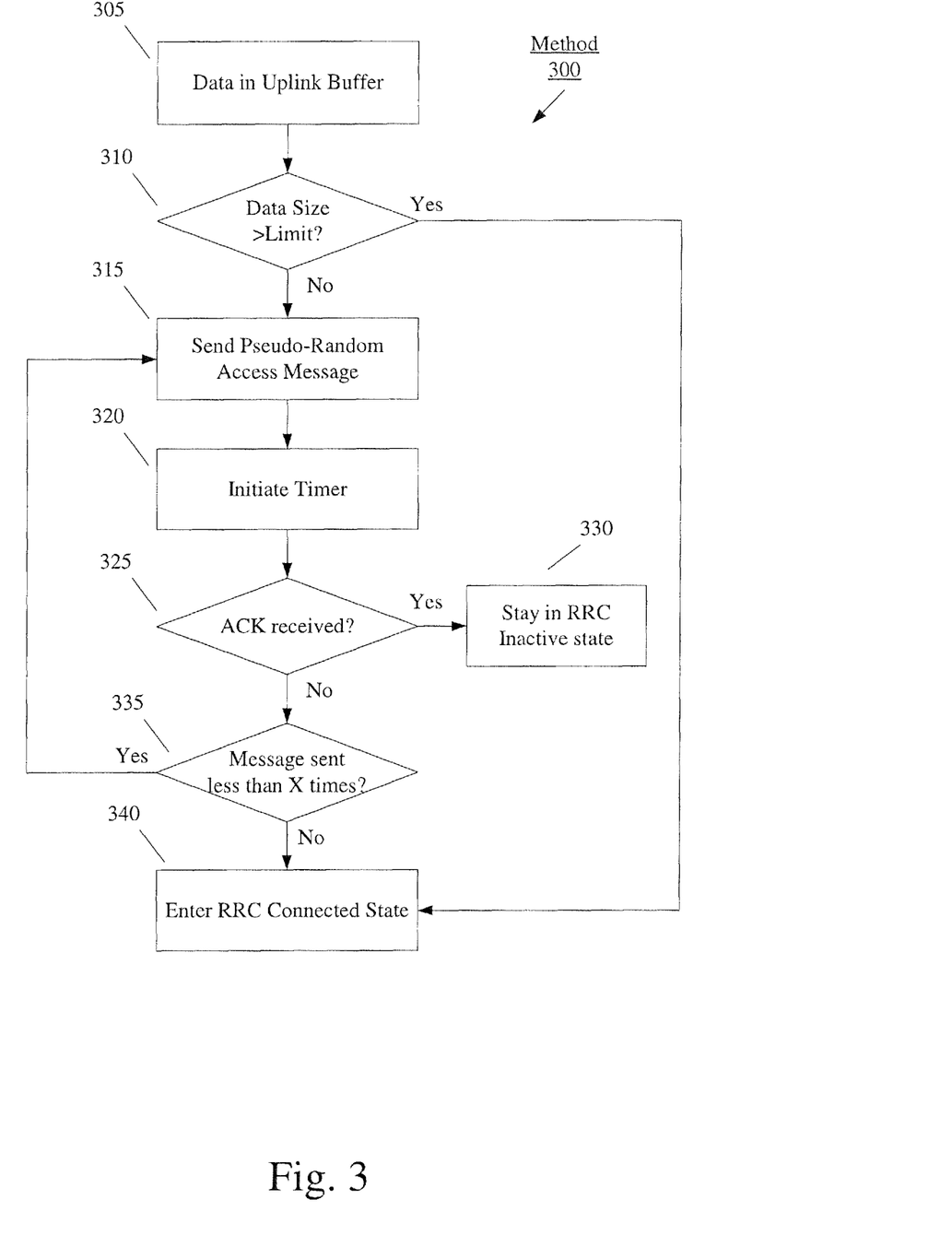
FIG. 3 shows a first exemplary method for initiating small data transfers in an inactive state according to various exemplary embodiments described herein.

FIG. 3 shows a first exemplary method 300 for initiating small data transfers in an inactive state according to various exemplary embodiments described herein. The method 300 will be described with reference to the network arrangement 100 of FIG. 1 and the UE 105 of FIGS. 1 and 2 as applied to small data transfers on an uplink to a base station. The base station may be one of the gNBs 110-120 shown in FIG. 1. "Small data" may refer to data on the order of kilobytes. For example, the small data may be approximately 2 kB, and may comprise background data, control data such as periodic keep alive messages, signaling data such as RAN Notification Area (RNA) update procedures, music streaming data, etc. However, the method is not limited by the type of data, and the maximum limit for an amount of data to be considered "small data" is configurable and may be any amount capable of being sent in a Medium Access Control (MAC) transport block (e.g., the payload size of a MAC transport block), as will be described in greater detail below.

In 305, it may be considered that the UE 105 is in the RRC inactive state and has data in an uplink buffer to be transferred to the network. In 310, the UE 105 determines whether the amount of data in the uplink buffer is above a predetermined threshold. As indicated above, the predetermined threshold is configurable and may be based on an amount of data that may be sent in a MAC transport block. If the amount of data in the uplink buffer is greater than the predetermined threshold, the method may continue to 340 where the UE 105 may enter the RRC connected state to transfer the data. If the amount of data in the uplink buffer is not greater than the predetermined threshold, the method proceeds to 315. The determination of the amount of data currently in the uplink buffer as shown in 310 may be a continuous determination that occurs throughout the performance of the method 300. If the amount of data in the buffer exceeds the threshold at any time during the performance of the method 300, the method may proceed to 340 and the UE 105 may enter the RRC connected state to transmit the data to the 5G NR RAN 125.

In 315, the UE 105 sends a message to the 5G NR RAN 125. Prior to describing the message, it is noted that in a 5G NR RAN, a random access ("RACH") procedure may be used by a UE to, among other things, synchronize with the 5G NR RAN. The 5G NR RACH procedure includes the UE sending a message to the 5G NR RAN, the message including a MAC transport block with an identifier and a payload comprising a RACH preamble. The message of 315 may correspond to the first message sent during a RACH procedure. The message may include a MAC transport block comprising a header and a payload. The header may be an I-RNTI, e.g., a radio network temporary identifier for use by the UE 105 in the RRC inactive state. However, the payload of the MAC transport block, rather than comprising the RACH preamble, may be the data in the uplink buffer. Thus, the message may be considered a pseudo-RACH message, and the method 300 may be considered a pseudo-RACH procedure. Thus, the operation performed in 315 is not a RACH procedure, but is described as a pseudo-RACH procedure because the message that is transmitted has similar characteristics (e.g., fields) as the first message transmitted by the UE during an actual RACH procedure. While the fields of the pseudo-RACH message may be the same, the data that is included in the fields may be different from the first message of a RACH procedure. Upon receiving the pseudo-RACH message, the 5G NR RAN 125 may route the pseudo-RACH message to the core network 130, while continuing to stay in RRC-Inactive state. The pseudo-RACH message will be routed to an appropriate server in the core network 130 (or another network) depending on the I-RNTI indicated in the header.

In 320, the UT 105 initiates a timer for receiving an acknowledgment ("ACK") from the 5G NR RAN 125. In 325, the UE 105 determines whether an ACK has been received from the 5G NR RAN 125 within the duration of the timer. The timer duration may be, for example, between 200 and 500 milliseconds. However, the timer duration is configurable and may be less than or greater than the exemplary range. If the UE 105 receives an ACK within the timer duration, then the small data has been transferred successfully, the method continues to 330 and the UE 105 remains in the RRC inactive state. However, the UE 105 may not receive an ACK if the pseudo-RACH message is not successfully received by the 5G NR RAN. If the UE 105 does not receive an ACK within the timer duration, the method proceeds to 335.

In 335, the UE 105 determines how many times it has attempted to transfer the pseudo-RACH message to the 5G NR RAN 125. If the pseudo-RACE message has been sent less than a predetermined number of times, the method returns to 315 and the UE 105 sends the pseudo-RACE message again in a second attempt to transfer the small data. The method 300 repeats until either the pseudo-RACH message is successfully received by the 5G NR RAN 125 or has been sent the predetermined number of times. The predetermined number of times is configurable, and in one example is 3 times. If the pseudo-RACE message has been sent the predetermined number of times, without success, the method proceeds to 340 where the UE 105 enters the RRC connected state to send the data in the uplink buffer, and the method ends.

The method 300 may be stopped at any point when there is high priority downlink data for the UE 105. Thus, if the UE 105 determines there is high priority downlink data destined for the UE 105 (e.g., based on scheduling information received from the 5G NR RAN 125), the UE 105 may enter the RRC connected state to receive the high priority data. Thus, the small data in the uplink buffer may be transferred while in the RRC connected state, rendering the pseudo-random access procedure unnecessary.

The foregoing method allows the UE 105 to stay in the RRC inactive state for as long as possible while transferring small amounts of data on the uplink. Entering the RRC connected state can be avoided until the amount of data in the uplink buffer has reached a predetermined limit, until high priority data is scheduled to arrive on the downlink, or until the pseudo-random access procedure fails a predetermined number of times. Maintaining the RRC inactive mode saves battery life and avoids the signaling overhead that would result from more frequent transitions between the RRC inactive state and the RRC connected state.

The method 300 provided an example of the UE 105 using a pseudo-RACH message to send the small amount of data to the network in the RRC inactive state. However, there may be other types of messages that are sent from the UE 105 to the network when the UE 105 is in the RRC inactive state. In a similar manner as described above for the pseudo-RACH message, these other types of messages may be modified to allow the UE 105 to uplink a small amount of data to the network while remaining in the RRC inactive state.

Figure 4:
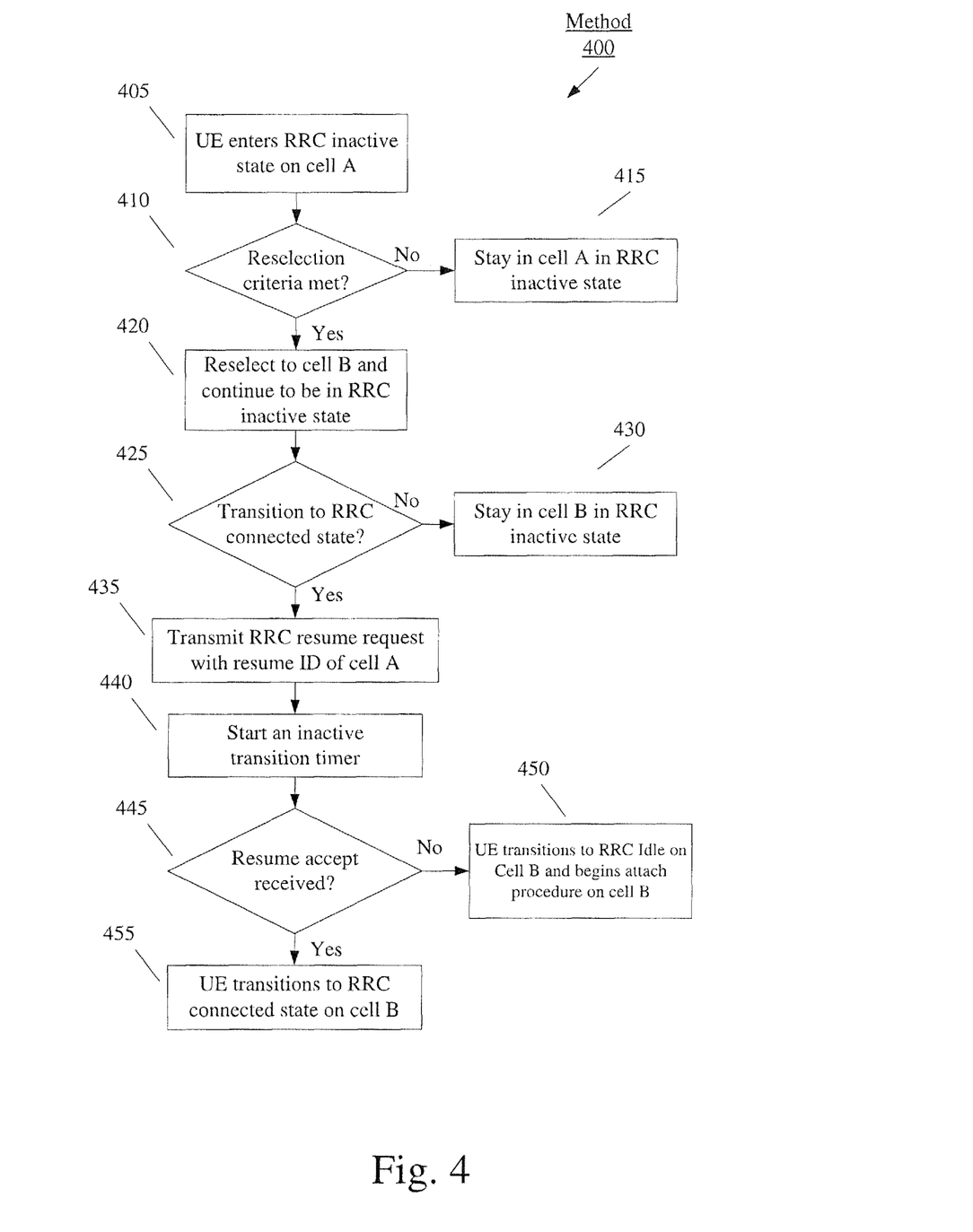
FIG. 4 shows a second exemplary method for resuming an inactive state during a cell reselection according to various exemplary embodiments described herein.

FIG. 4 shows a second exemplary method 400 for resuming an inactive state during a 5G NR cell reselection according to various exemplary embodiments described herein. The method 400 will be described with reference to the network arrangement 100 of FIG. 1 and the UE 105 of FIGS. 1 and 2 as applied to a cell reselection procedure for the UE 105. The base stations may be the gNBs 110-120 shown in FIG. 1.

A cell reselection is initiated when one or more cell reselection criteria is met at a UE. For instance, the UE 105 may experience a signal quality drop below a predetermined threshold while the UE 105 is camped on a first cell. When this occurs, the UE 105 may determine whether other reselection criteria are met and attempt to camp on a second cell.

The UE 105 enters the RRC idle state to perform a cell reselection. However, the exemplary method 400 bypasses the idle state, allowing the UE 105 to retain radio bearer (RB) and security contexts and avoid a full RRC attach procedure. As will be described in further detail below, when the exemplary cell reselection procedure is completed, the UE 105 may temporarily enter the RRC connected state on the second cell before transitioning back to the RRC inactive state at the second cell.

In 405, it may be considered that the UE 105 enters the RRC inactive state while camped on a first cell, e.g. the gNB 110 as depicted in the network arrangement 100 of FIG. 1. In 410, the UE 105 determines whether cell reselection criteria have been met. Cell reselection criteria may at least include a signal quality threshold below which the UE 105 determines that a reselection to a different cell is desirable. However, further criteria may be applied for determining whether a cell reselection is warranted. If the cell reselection criteria have not been met, the method proceeds to 415 and the UE 105 remains on the first cell in the RRC inactive state. If the cell reselection criteria have been met, the method proceeds to 420.

In 420, the UE 105 reselects to a second cell. The second cell may be, for example, gNB 115 as depicted in the network arrangement 100 of FIG. 1. Rather than enter the RRC idle state, the UE 105 directly transitions to the inactive state on the second cell.

In 425, the UE 105 determines whether the UE 105 should transition to the RRC connected state. The UE 105 may determine that the transition to the RRC connected state should occur when, e.g., there is data on the uplink or the downlink. For example, the UE 105 may be participating in a voice call and may have mobile originating (MO) data or may be receiving mobile terminating (MT) data. If the UE 105 determines that there should be no transition to the RRC connected state, the method proceeds to 430 and the UE 105 stays in the inactive state on the second cell. If the UE 105 determines that there should be a transition to the RRC connected state, the method proceeds to 435. This determination may be a continuous determination as the UE 105 remains in the RRC inactive state while camped on the second cell, e.g., the method 400 may loop back from 430 to 425 to determine if the UE 105 should transition to the RRC connected state.

In 435, the UE 105 transmits an RRC resume request to the second cell. The RRC resume request signals to the second cell that the UE 105 seeks to resume an RRC connected state. However, the UE 105 has not yet entered the RRC connected state on the second cell. Thus, the RRC resume request transmitted by the UE 105 may comprise a resume ID of the first cell, the cell ID of the first cell, and the operating frequency used at the first cell. It will be understood by those skilled in the art that when the second cell receives the RRC resume request including the information for the first cell and an identification of the UE 105, the second cell may exchange data with the first cell (e.g., directly via an X2 interface or indirectly through the 5G NR RAN 125 and/or cellular core network 130) to set up the RRC connected state with the UE 105.

In 440, the UE 105 starts an inactive transition timer. The timer duration may be, for example, between 500 milliseconds and 1 second. However, the timer duration is configurable and may be less than or greater than the exemplary range. In 445, the UE 105 determines whether an RRC resume accept has been received from the second cell before the expiration of the timer. If the RRC resume accept has not been received before the expiration of the timer, the method proceeds to 450 and the UE 105 transitions to the RRC idle state and begins a full RRC attach procedure with the second cell. If the RRC resume accept has been received before the expiration of the timer, the method proceeds to 455 and the UE transitions to the RRC connected state on the second cell.

Thus, in the method 400, the UE 105 may transition directly from a first cell to a second cell in the RRC inactive state, saving the power associated with transitioning to the RRC idle state. Subsequently, when the UE 105 desires to transition to the RRC connected state with the second cell, the RRC resume request may allow the UE 105 to transition to the RRC connected state without entering the RRC idle state, again saving the power associated with such a transition.

Figure 5:
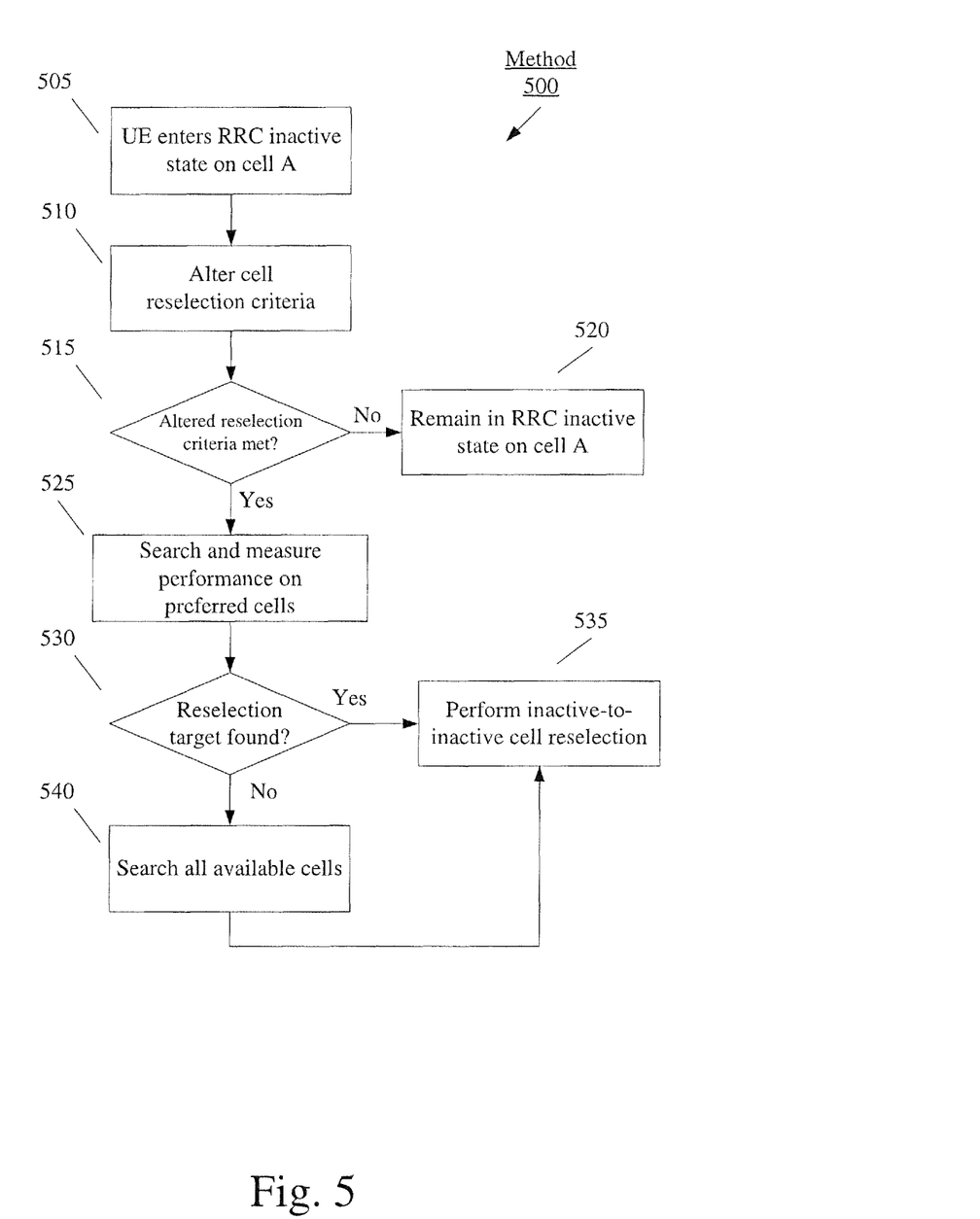
FIG. 5 shows a third exemplary method for selecting a cell to facilitate a resumption of an inactive state during a cell reselection according to various exemplary embodiments described herein.

FIG. 5 shows a third exemplary method 500 for selecting a cell to facilitate a resumption of an RRC inactive state during a cell reselection according to various exemplary embodiments described herein. Method 500 may be executed in combination with method 400, for reasons to be explained in further detail below. The method 500 may be executed while in the RRC inactive state to alter the criteria for initiating a cell reselection, and further to select a cell for reselection that has a high probability for a successful inactive-to-inactive transition as described in the method 400. The method 500 will be described with reference to the network arrangement 100 of FIG. 1 and the UE 105 of FIGS. 1 and 2 as applied to a cell reselection procedure for the UE 105. The base stations may be the gNBs 110-120 shown in FIG. 1.

In 505, it may be considered that the UE 105 enters the RRC inactive state while camped on a first cell, e.g., the gNB 110 as depicted in the network arrangement 100 of FIG. 1. In 510, the UE 105 alters the cell reselection criteria. As noted above with respect to method 400, cell reselection criteria may at least include a signal quality threshold below which the UE 105 determines that a reselection to different cell is desired. In one example, the operation in 510 may include lowering the signal quality threshold that will trigger a cell reselection. Although reselection thresholds are configured by the 5G NR RAN 125, the UE 105 is generally responsible for performing any reselections. Thus, the UE 105 may choose to temporarily ignore the signal quality measurements or reselection thresholds (or locally set different reselection thresholds) to remain camped on the first cell in the RRC inactive state. By delaying reselection to a new cell, this may allow the UE 105 to remain in the RRC inactive state for a longer duration to save the battery power associated with cell reselection and state transitions. The cell reselection criteria for the RRC connected state and the RRC idle state may remain the same, e.g. at the original values. The altered reselection criteria may be set such that the reselection criteria is less aggressive in performing reselections, but should be set such that an out of service ("OOS") condition with the first cell is unlikely to occur.

In 515, the UE 105 determines whether the altered cell reselection criteria have been met. If the altered cell reselection criteria have not been met, the UE 105 remains camped on the first cell in the RRC inactive state as shown in 520. If the altered cell reselection criteria have been met, the method proceeds to 525.

In 525, the cell reselection procedure is initiated, and the UE 105 searches and takes measurements on a preferred list of cells. The preferred list of cells may comprise cells that have previously been reselected to from the first cell while the UE 105 remained in the RRC inactive state, in accordance with the method 400. For example, it may be considered that the UE 105 previously executed the method 400 to reselect from the first cell (e.g., gNB 110) to a second cell (e.g., gNB 115) while remaining in the RRC inactive state, and subsequently resumed the RRC connected state without transitioning to the RRC idle state or performing a full attach procedure on the second cell. When the method 400 is performed successfully, the first cell to second cell reselection is stored in the preferred list of cells. The preferred list of cells may be a normal performance group ("NPG") stored on the memory arrangement 210 of the UE 105. Thus, it may be considered that the UE 105 performs a reselection search and measurement on a list of cells that have previously been the successful target of an inactive-to-inactive cell reselection. If the UE 105 has previously performed an inactive-to-inactive reselection from the gNB 110 to the gNB 115, and has also performed an inactive-to-inactive reselection from the gNB 110 to the gNB 120, then the preferred list of cells will include the gNBs 115 and 120 and the UE 105 will search for and take measurements on the gNBs 115 and 120 while in the RRC inactive state on gNB 110 in 525. If, for example, there has been no previous successful inactive-to-inactive reselections from the gNB 110 to the gNB 115, the gNB 115 will not be included on the preferred list of cells and measurements will not be taken for the gNB 115 in 525.

In 530, the UE 105 determines whether a cell reselection target has been found prior to the UE 105 experiencing out of service ("OOS") conditions. If a second cell from the preferred list has been found prior to OOS conditions being met, the method 500 proceeds to 535 and the UE 105 attempts an inactive-to-inactive cell reselection in accordance with the method 400. If a second cell from the preferred list of cells has not been found prior to COS conditions being met, the method proceeds to 540.

In 540, the UE 105 broadens the reselection search to include all available cells, in accordance with a typical reselection search and measurement. When a reselection target has been identified, the method may proceed to 535 and the UE 105 may attempt an inactive-to-inactive reselection in accordance with the method 400. If the inactive-to-inactive reselection is performed successfully with a reselection target that is not found on the preferred list, the reselection target may subsequently be added to the preferred list. Thus, if, at a later time, the UE 105 is camped on the first cell in the RRC inactive state, the reselection target will be a preferred reselection target that is searched in 525.

Figure 6:
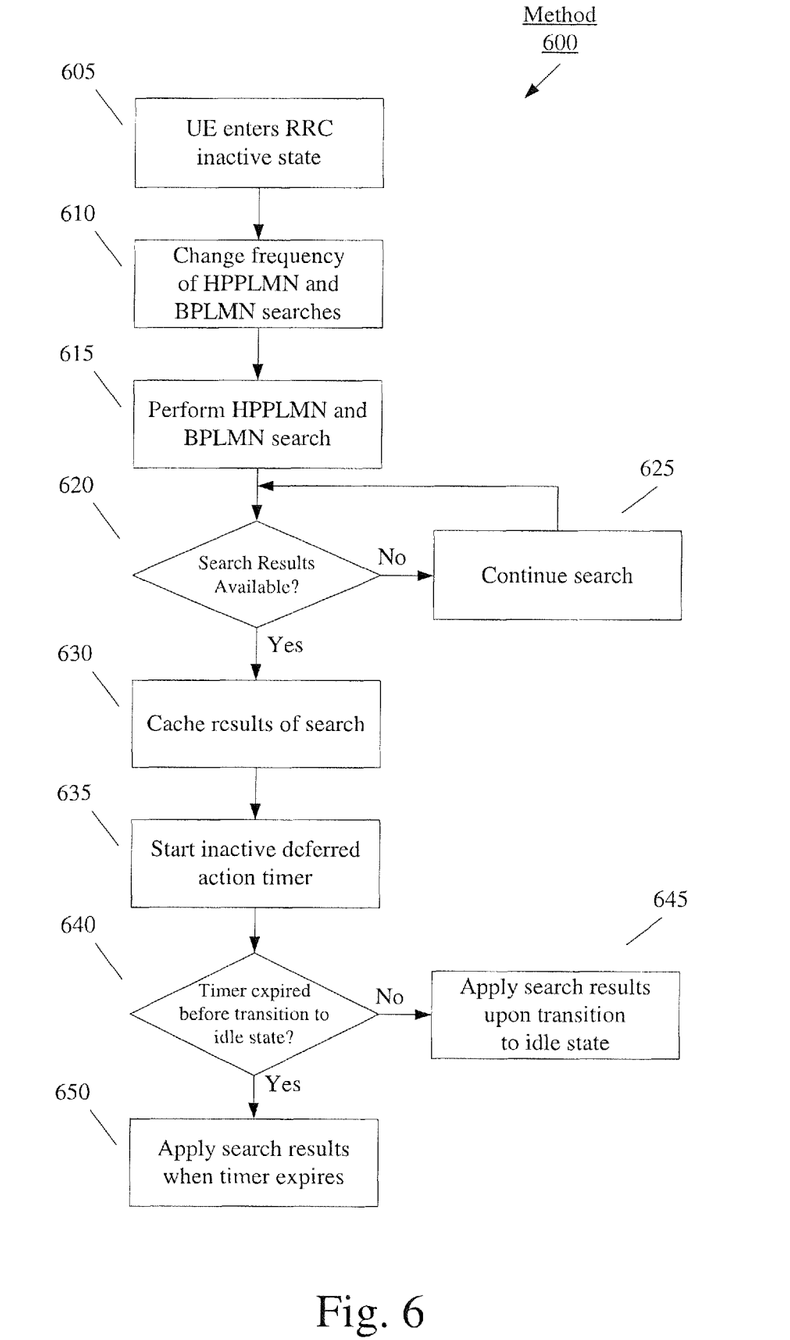
FIG. 6 shows a fourth exemplary method for deferring PLMN activities while in an inactive state according to various exemplary embodiments described herein.

FIG. 6 shows a fourth exemplary method for deferring public land mobile network ("PLMN") activities while in an inactive state according to various exemplary embodiments described herein. A PLMN is a network, such as the 5G NR RAN 125, provided by a cellular operator, e.g. Verizon, AT&T, Sprint, etc. Various PLMN-related activities are possible in the RRC inactive state, including, for example, manual PLMN selection, higher priority PLMN search and selection ("HPPLMN") and background PLMN search and selection ("BPLMN").

In 605, it may be considered that the UE 105 enters the RRC inactive state while camped on a first cell, e.g. the gNB 110 as depicted in the network arrangement 100 of FIG. 1. In 610, the UE 105 changes the frequency for performing HPPLMN and BPLMN searches. For example, the search may typically occur once every DRX cycle. In one example, the frequency of the searches may be changed to once every other DRX cycle, once every third DRX cycle, etc. However, the duration between searches may be set to any time.

In 615, the HPPLMN and/or BPLMN search may be initiated. In 620, the UE 105 determines whether search results are available. If search results are not yet available, the method proceeds to 625 and the UE 105 continues the HPPLMN and/or BPLMN search. If the search has concluded and results are available, the method proceeds to 630.

In 630, the UE 105 caches the results of the search. The UE 105 may store the results in the memory arrangement 210 of the UE 105. In 635, once the results of the search are cached, the UE 105 starts an inactive deferred action timer. The duration of the timer is configurable and may depend on the mobility state of the UE 105. For example, a fast-moving UE 105 (e.g., a UE located in a moving car) may initiate a shorter timer than a slow-moving UE 105 (e.g., a UE that is sitting on a user's desk or is with a person who is walking). The timer duration may be, for example, between 1 and 60 seconds. However, the timer duration is configurable and may be less than or greater than the exemplary range.

In 640, the UE 105 determines whether the inactive deferred action timer has expired prior to the UE transitioning to the RRC idle state. The UE 105 may transition to the RRC idle state for a variety of different reasons, some of which were described above. If the UE 105 transitions to the RRC idle state prior to the expiration of the timer, the method proceeds to 650 and the results of the search are immediately applied. If the UE 105 has not entered the RRC idle state prior to the expiration of the timer, the method proceeds to 645 and the UE 105 applies the search results upon the expiration of the timer.

It will be apparent to those skilled in the art that the foregoing method 600 may extend the amount of time that the UE 105 may remain in the RRC inactive state. By changing the frequency of the HPPLMN and BPLMN searches, the UE 105 will perform handovers to different PLMNs less frequently. Additionally, by caching the results of the search rather than applying the results of the search upon the completion of the search, the UE 105 remains camped on the first cell of the first PLMN in the RRC inactive state for a longer duration than would occur if the results of the search were applied upon the completion of the search.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A method, comprising:
    at a user equipment ("UE") in an inactive state and camped on a first cell of a radio access network ("RAN"):
    determining that one or more cell reselection criteria have been met;
    when the one or more cell reselection criteria have been met, reselecting to a second cell;
    sending a resume request to the RAN via the second cell, wherein the resume request includes an identification of the first cell and comprises a request to enter a connected state with the second cell;
    initiating a timer;
    when a resume accept is received from the RAN before expiration of the timer, transitioning to the connected state on the second cell; and
    when the resume accept is not received from the RAN before the expiration of the timer, transitioning to an idle state and performing an attach procedure with the second cell.

2. The method of claim 1, further comprising:
    transitioning from the connected state to the inactive state on the second cell.

3. The method of claim 1, further comprising:
    when in the inactive state and camped on the first cell, altering at least one of the cell reselection criteria, wherein the altering makes it less likely that a cell reselection will occur.

4. The method of claim 1, wherein the resume request comprises one of a resume ID of the first cell, a cell ID of the first cell, or an operating frequency used at the first cell.

5. The method of claim 3, wherein the altering of the at least one cell reselection criteria is based on, at least, an expected out of service (OOS) value of the at least one cell reselection criteria.

6. The method of claim 1, further comprising:
    performing a cell reselection search based on a preferred list of cells, wherein the preferred list of cells comprises one or more cells for which a previous inactive state to inactive state successful reselection from the first cell has occurred.

7. The method of claim 6, further comprising:
    when the cell reselection search does not determine an available cell from the preferred list of cells, performing a further cell reselection search that comprises cells not included on the preferred list of cells.

8. The method of claim 1, wherein the inactive state comprises a radio resource control (RRC) inactive state and the connected state comprises an RRC connected state.

9. A processor of a user equipment ("UE") in an inactive state and camped on a first cell of a radio access network ("RAN") and configured to perform operations comprising:
    determining that one or more cell reselection criteria have been met;
    when the one or more cell reselection criteria have been met, reselecting to a second cell;
    sending a resume request to the RAN via the second cell, wherein the resume request includes an identification of the first cell and comprises a request to enter a connected state with the second cell;
    initiating a timer;

when a resume accept is received from the RAN before expiration of the timer, transitioning to the connected state on the second cell; and when the resume accept is not received from the RAN before the expiration of the timer, transitioning to an idle state and performing an attach procedure with the second cell.

10. The processor of claim 9, wherein the operations further comprise:

transitioning from the connected state to the inactive state on the second cell.

11. The processor of claim 9, wherein the operations further comprise:

when in the inactive state and camped on the first cell, altering at least one of the cell reselection criteria, wherein the altering makes it less likely that a cell reselection will occur.

12. The processor of claim 11, wherein the altering of the at least one cell reselection criteria is based on, at least, an expected out of service (OOS) value of the at least one cell reselection criteria.

13. The processor of claim 9, wherein the resume request comprises one of a resume ID of the first cell, a cell ID of the first cell, or an operating frequency used at the first cell.

14. The processor of claim 9, wherein the operations further comprise:

performing a cell reselection search based on a preferred list of cells, wherein the preferred list of cells comprises one or more cells for which a previous inactive state to inactive state successful reselection from the first cell has occurred.

15. The processor of claim 14, wherein the operations further comprise:

when the cell reselection search does not determine an available cell from the preferred list of cells, performing a further cell reselection search that comprises cells not included on the preferred list of cells.

16. The processor of claim 9, wherein the inactive state comprises a radio resource control (RRC) inactive state and the connected state comprises an RRC connected state.

17. A user equipment ("UE"), comprising:

a transceiver configured to camp on a first cell of a radio access network ("RAN");

a processor configured to operate in an inactive state and configured to perform operations comprising:

determining that one or more cell reselection criteria have been met;

when the one or more cell reselection criteria have been met, reselecting to a second cell;

sending a resume request to the RAN via the second cell, wherein the resume request includes an identification of the first cell and comprises a request to enter a connected state with the second cell;

initiating a timer;

when a resume accept is received from the RAN before expiration of the timer, transitioning to the connected state on the second cell; and when the resume accept is not received from the RAN before the expiration of the timer, transitioning to an idle state and performing an attach procedure with the second cell.

* * * * *